US011072411B2

(12) United States Patent
Hitchcock et al.

(10) Patent No.: US 11,072,411 B2
(45) Date of Patent: Jul. 27, 2021

(54) DEVICES AND METHODS FOR DIVERTING MOISTURE FROM A SUPPORT MEMBER

(71) Applicant: The Boeing Company, Chicago, IL (US)

(72) Inventors: Cory M. Hitchcock, Granite Falls, WA (US); Michael D. Maultsby, Everett, WA (US); Douglas A. Lods, Everett, WA (US)

(73) Assignee: THE BOEING COMPANY, Chicago, IL (US)

( * ) Notice: Subject to any disclaimer, the term of this patent is extended or adjusted under 35 U.S.C. 154(b) by 662 days.

(21) Appl. No.: 15/729,742

(22) Filed: Oct. 11, 2017

(65) Prior Publication Data
US 2019/0106191 A1    Apr. 11, 2019

(51) Int. Cl.
*B64C 1/06* (2006.01)
*B64C 1/40* (2006.01)

(52) U.S. Cl.
CPC ............... *B64C 1/067* (2013.01); *B64C 1/40* (2013.01)

(58) Field of Classification Search
CPC .......... B64C 1/067; B64C 1/40; B64C 1/406; B64C 1/403; F28D 15/00; B60R 13/08; F16L 59/021; F16L 59/168; F16L 59/02; F16L 59/161; F16L 59/027; F16L 47/22; B08B 3/00; B08B 3/003; B08B 3/02; B08B 3/024; B08B 3/04; B08B 3/10; B08B 3/106; B65B 39/00; B67C 11/00; B67C 11/02; D06F 39/081
See application file for complete search history.

(56) References Cited

U.S. PATENT DOCUMENTS

| | | | |
|---|---|---|---|
| 2,937,036 A * | 5/1960 | Watkins | F16L 27/12 285/41 |
| 4,235,398 A | 11/1980 | Johnson | |
| 5,067,291 A | 11/1991 | Evensen | |
| 5,520,009 A | 5/1996 | Jepsen et al. | |
| 5,577,688 A | 11/1996 | Sloan | |
| 5,788,184 A | 8/1998 | Eddy | |
| 5,827,598 A | 10/1998 | Larsen et al. | |

(Continued)

FOREIGN PATENT DOCUMENTS

| | | |
|---|---|---|
| DE | 102011001267 A1 | 9/2012 |
| EP | 1358064 | 11/2003 |

(Continued)

OTHER PUBLICATIONS

Huber et al. 'Controlling Nuisance Moisture in Commercial Airplanes' Aero 05 (QTR_01 1999) (Retrieved from the internet at the following URL: http://www.boeing.com/commercial/aeromagazine/articles/2015_q1/archive.html) Jan. 1999.

*Primary Examiner* — Medhat Badawi
*Assistant Examiner* — Vicente Rodriguez
(74) *Attorney, Agent, or Firm* — Coats & Bennett, PLLC

(57) ABSTRACT

Devices and methods to control moisture at a support member in a vehicle. The devices are configured to be attached to the support member and include a moisture absorbing portion and an evaporative portion. Methods of assembling the support member in the vehicle include prefabricating the device and preassembling the device onto the support member prior to the support member being installed in the vehicle.

20 Claims, 13 Drawing Sheets

(56) References Cited

U.S. PATENT DOCUMENTS

| | | | | |
|---|---|---|---|---|
| 6,012,480 | A | * | 1/2000 | Helmsderfer ............ F16L 7/00 |
| | | | | 137/247.49 |
| 6,315,849 | B1 | | 11/2001 | Ross |
| 6,531,206 | B2 | | 3/2003 | Johnston et al. |
| 6,746,567 | B2 | | 6/2004 | Johnston et al. |
| 6,803,090 | B2 | | 10/2004 | Castiglione et al. |
| 7,159,620 | B2 | * | 1/2007 | Kissell ................. F16L 59/021 |
| | | | | 138/149 |
| 7,677,500 | B2 | | 3/2010 | Redecker |
| 2003/0024185 | A1 | | 2/2003 | Menzies |
| 2003/0102076 | A1 | | 6/2003 | Johnston et al. |
| 2003/0104170 | A1 | | 6/2003 | Johnston et al. |
| 2006/0016204 | A1 | * | 1/2006 | Brokaw ................ F16L 59/141 |
| | | | | 62/273 |
| 2012/0126059 | A1 | | 5/2012 | Piuzzi et al. |
| 2013/0009010 | A1 | * | 1/2013 | Auriac ................... B64C 1/403 |
| | | | | 244/129.1 |
| 2013/0020434 | A1 | * | 1/2013 | Muller ..................... B64C 1/40 |
| | | | | 244/1 N |
| 2013/0168496 | A1 | | 7/2013 | Roth |
| 2013/0344762 | A1 | | 12/2013 | Vermont et al. |
| 2017/0305027 | A1 | * | 10/2017 | Broeker ................ B26D 7/015 |
| 2017/0370643 | A1 | * | 12/2017 | Gray ...................... B64C 1/067 |
| 2018/0065726 | A1 | * | 3/2018 | Berryessa ................ B64F 5/40 |

FOREIGN PATENT DOCUMENTS

| | | | |
|---|---|---|---|
| WO | 9118237 | A1 | 11/1991 |
| WO | 2003097344 | A1 | 11/2003 |

* cited by examiner

DEVICES AND METHODS FOR DIVERTING MOISTURE FROM A SUPPORT MEMBER

TECHNOLOGICAL FIELD

The present disclosure generally relates to moisture control. More particularly, the present disclosure relates to devices and methods for diverting moisture from a support member in a vehicle.

BACKGROUND

In an aircraft, the outer skin is spaced from the walls and ceiling of a passenger cabin (or other compartment), and the gap is at least partially filled with an insulation layer. The insulation layer is typically formed from a waterproof material. During a flight, liquid from moist air can condense against the skin and freeze during cruise. During decent, this frozen liquid can thaw and drip back down towards the cabin. Because the insulation layer is waterproof, the condensate can flow along the insulation layer and drain into the bilge. However, at some locations, structures and/or supports can protrude through the insulation layer. For example, support members that hold monuments and bins to the crown extend from the structure at the skin, through the insulation layer, and into the cabin. The insulation layers come with predefined holes for the support members to extend through the insulation layer. The holes are lined, and there can be a gap defined between the inner surface of the hole and the support member. When liquid thaws, it can drip down through the hole and into the cabin.

One current practice is to manually wrap the support member with a material so the material absorbs the condensate and allows the condensate to evaporate back into the air. However, the condensate can be more than the material can absorb. Further, manually wrapping each support in material after the support member is installed in the aircraft can be time-consuming. More specifically, as the support members are often located in the overhead portion of the aircraft it is time consuming for a technician, working overhead, to manually wrap the support members.

SUMMARY

The present application includes a moisture diverting device for use with a support member. The moisture diverting device provides for absorbing and evaporating the moisture. The device is further configured to be prefabricated and preassembled onto the support member prior to installation onto the vehicle.

One aspect is directed to a device to divert moisture from a support member. The device includes a first portion with a leading edge, a trailing edge, and a first opening that extends between the edges and that is sized to receive the member. The first portion is fabricated from a moisture absorbent material. A second portion is positioned at the trailing edge of the first portion. The second portion has a second opening that is aligned with the first opening to receive the member. The second portion is fabricated from an evaporative material. The second portion is coupled to the first portion such that the moisture absorbed by the first portion is transmitted to and evaporated by the second portion.

Another aspect is directed to a method of diverting moisture from a support member. The method includes positioning a first end of a support member at a structural member with the support member including a moisture diverting device that extends around the support member and is attached to the support member away from the first end. The method includes connecting the first end of the support member to the structural member while the moisture diverting device is attached to the support member and positioned away from the first end. The method includes moving the moisture diverting device along the support member while the moisture diverting device remains around the support member. A first portion that is fabricated from a moisture absorbent material is positioned over the first end of the support member that is attached to the structural member. A second portion of the device that is coupled to the first portion is positioned away from the first end of the support member with the second portion fabricated from an evaporative material.

Another aspect is directed to a vehicle with a first wall, and a second wall positioned within and spaced away from the first wall. A structural member is positioned between the first and second walls. A support member at the second wall and that has an end connected to the structural member. A moisture diverting device is attached to the support member and extends over the end of the support member to divert moisture away from the support member. The moisture diverting device includes a first portion with a leading edge, a trailing edge, and a first opening that extends between the edges and that is sized to receive the member with the first portion fabricated from a moisture absorbent material. The moisture diverting device also includes a second portion positioned at the trailing edge of the first portion with the second portion having a second opening that is aligned with the first opening to receive the member and with the second portion fabricated from an evaporative material. The second portion is coupled to the first portion such that the moisture absorbed by the first portion is transmitted to and evaporated by the second portion.

DETAILED DESCRIPTION

The present application is directed to devices and methods to control the moisture at a support member in a vehicle. The devices are configured to be attached to the support member and include a moisture absorbing portion and an evaporative portion. Methods of assembling the support member in the vehicle include prefabricating the device and assembling the device onto the support member prior to the support member being installed in the vehicle.

Figure 1:
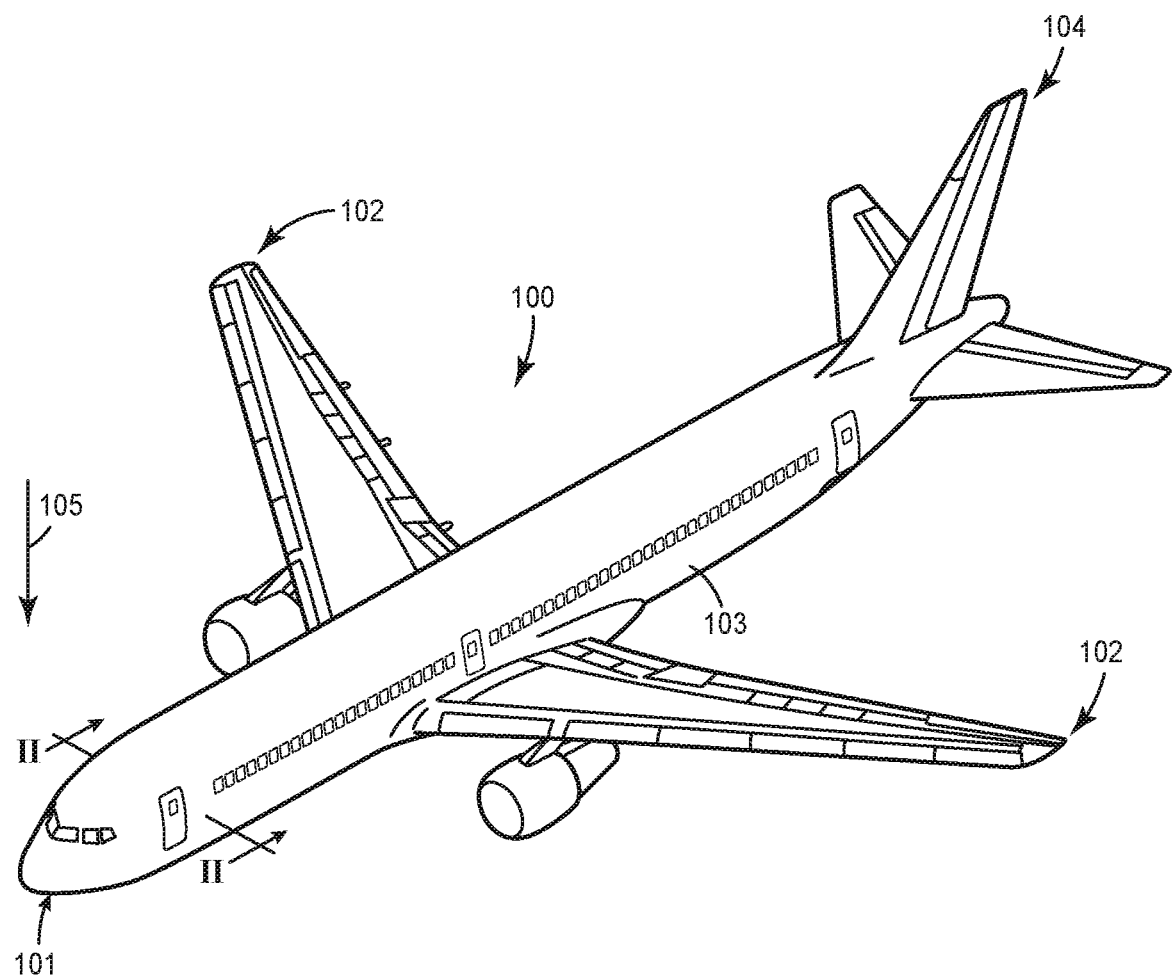
FIG. 1 is a perspective view of a vehicle.

The devices and methods apply to a variety of different vehicles. FIG. 1 illustrates an aircraft 100 which is one of the types of vehicles 100 applicable to the devices and methods. The aircraft 100 includes a nose 101, wings 102, a fuselage 103, and a tail 104. FIG. 1 also illustrates a downward arrow 105 indicating the expected direction in which the force of gravity will pull objects, such as liquid water, onboard an aircraft 100 in a nominal operational profile.

Figure 2:
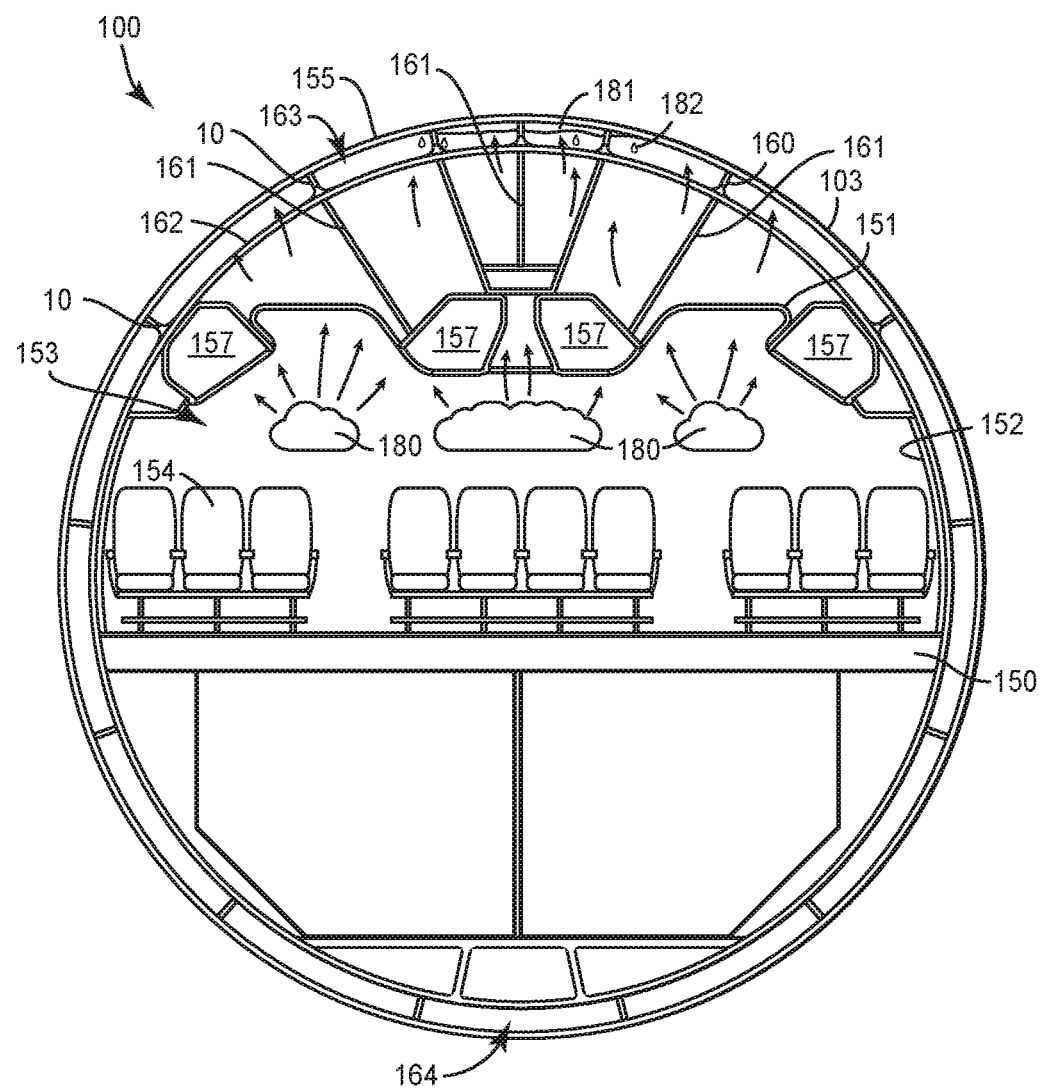
FIG. 2 is a schematic section view of the vehicle of FIG. 1 cut along the line II-II.

FIG. 2 is a cross-sectional, schematic view of the aircraft 100 indicated by view arrows 2 in FIG. 1. FIG. 2 illustrates a simplified version of a portion of the aircraft fuselage 103 that includes an outer "first wall" 155. The fuselage 103 includes a floor 150, ceiling 151, insulation layer 162, and aesthetic fascia walls 152. For purposes of explanation, one or more of the ceiling 151, insulation layer 162, luggage compartment 127, aesthetic fascia walls 152, ducting, equipment, rack, and various other walls within the first wall 155 represent a "second wall" 162 of the aircraft 100. The cabin 153 is formed within the second wall 162 and includes seats 154, aisles, and various other components for the passengers. Structural members 160 are positioned at the first wall 155 of the aircraft 100. One aspect includes the structural members 160 being support beams that extend outward from the first wall 155. Support members 161 are attached to the structural members 160 to support various components which can include luggage compartments 157, the ceiling 151, fascia walls 152, ducting, equipment, and racks.

Respiration and other sources of water cause moisture 180 to enter or form in the air in the cabin 153. For example, warm exhaled air includes moisture 180 and rises upward through the luggage compartments 157. Some of this warm and moist air rises through the ceiling 151. Furthermore, some warm air continues to rise upward through the second wall 162 into a space 163 between the first wall 155 and the second wall 162 of the aircraft 100. The second wall 162 can include a variety of constructions. One aspect includes the second wall 162 being the insulation layer 162. Other aspects include the second wall 162 being a fascia wall 152, structural wall, and luggage compartment wall 157.

As the first wall 155 is cooled by the outside air at high altitude during flight, the temperature of the first wall 155 eventually decreases to a temperature below the freezing temperature of water. This cooling causes the moisture 180 (e.g., water) to condense out of the air in the space 163 and freeze onto the inner surface of the first wall 155 as ice 181. As the temperature increases when the aircraft 100 changes to a lower altitude and/or commences descent for landing, the ice 181 begins to melt causing water droplets 182 to form that travel through the space 163 towards a bottom 164 of the fuselage 103. Some water droplets 182 enter gaps in the insulation layer 162, particularly where the support members 161 are attached to the structural members 160.

Moisture diverting devices 10 are attached to the support members 161 to divert the moisture, i.e., the water droplets 182. The diverting of the moisture includes capturing the leaked moisture, retaining the captured moisture in the device 10, and expelling the moisture through evaporation.

The devices 10 extend around the support members 161 and are configured to be positioned at the ends of the support members 161 where they attach to the structural members 160. The devices 10 include a first portion that absorbs the moisture and a second portion that allows for the moisture to evaporate. The devices 10 are further configured to be prefabricated and preassembled onto the support members 161 prior to the attachment of the support members 161 to the structural members 160. Once the support member 161 is connected to the structural member 160 during assembly, the device 10 can be moved along the support member 161 and into position to divert the moisture.

Figure 3:
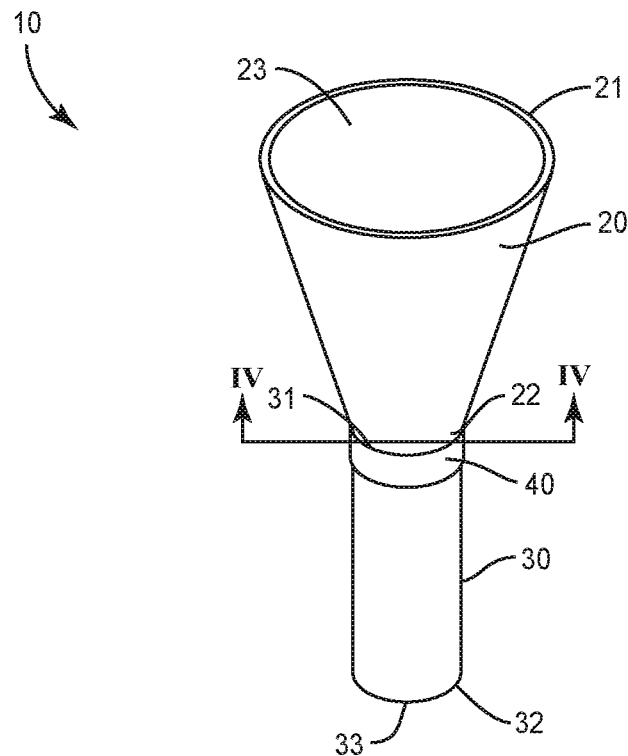
FIG. 3 is a perspective view of a moisture diverting device.

FIG. 3 illustrates a device 10 configured to be attached to one of the support members 161. The device 10 includes a first portion 20, a second portion 30, and a flexible and/or elastic band 40. The first and second portions 20, 30 are attached together such that water that is initially absorbed by the first portion 20 is subsequently moved to the second portion 30 where it evaporates. The band 40 can be attached to the first and/or second portions 20, 30, or can be a separate member that is positioned over the first and/or second portions 20, 30. The band 40 is configured to apply a compressive force to hold the device 10 onto the support member 161 at the desired position.

The different portions 20, 30 of the device 10 function to divert the moisture from the support member 161. The first portion 20 captures the moisture through its shape and moisture absorbing material. The captured moisture is initially retained in the first portion 20 and subsequently transferred to the second portion 30. The second portion 30 receives the moisture and is fabricated from a material and shaped for the moisture to evaporate.

The first portion 20 includes a first end 21 and a second end 22. An opening 23 (also referred to as a first opening 23) extends through the first portion 20 and is sized to receive the support member 161. The first portion 20 is shaped with the first end 21 having a larger diameter B1 than a diameter B2 of the second end 22. In one aspect, the first portion 20 has a tapered shape with the larger first end 21 that reduces to the smaller second end 22. The taper can be consistent along the length of the first portion 20 from the first end 21 to the second end 22 as illustrated in FIG. 3. Other tapered shapes can include but are not limited to a taper along a limited section of the length, and different sections of the length having different tapers. One aspect includes the first portion 20 with a frusto-conical shape.

The first portion 20 can be constructed from a variety of different moisture absorbent materials, including but not limited to felt.

The second portion 30 is positioned at the second end 22 of the first portion 20. The second portion 30 has a cylindrical shape with a first end 31 and opposing second end 32. The first end 31 can abut against the second end 22 of the first portion 20, or can overlap with the second end 22. In an overlapping arrangement, the first end 31 can be positioned within or on the outside of the second end 22. The amount of overlap between the portions 20, 30 can vary. The portions 20, 30 can be connected together in a variety of different manners, including but not limited to adhesive, bonding, heat staking, stitching, and mechanical fasteners. Optionally, the first portion 20 is formed unitarily with the second portion 30.

The second portion includes an opening 33 (also referred to as the second opening 33) that extends the length of the second portion 30. The opening 33 is configured to be aligned with the opening 23 of the first portion 20 and together are sized to receive the support member 161. The openings 23, 33 can have the same or different sizes.

Figure 16:
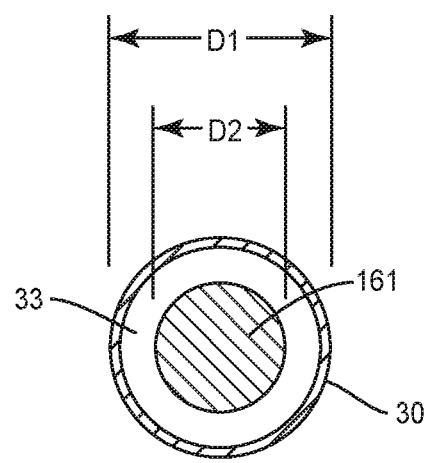
FIG. 16 is a section view cut along line XVI-XVI of FIG. 13.

The second portion 30 can be fabricated from an elastic material to expand when placed on to the support member 161. One aspect as illustrated in FIG. 16 includes the opening 33 with an inner diameter D1 that is 20% greater than the outer diameter D2 of the support member 161. Other aspects may include different sizes relative to the support member 161. The second portion 30 can be constructed from a variety of different evaporative materials, including but not limited to Nomex felt.

The first portion 20 can be fabricated from the same or different material as the second portion 30. One aspect includes the portions 20, 30 each constructed from the same material. One specific aspect includes each portion 20, 30 fabricated from felt.

Figure 4:
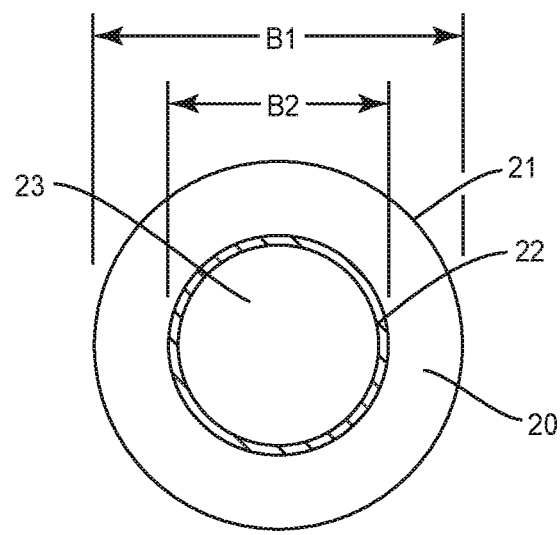
FIG. 4 is a section view cut along line IV-IV of FIG. 3.
Figure 5:
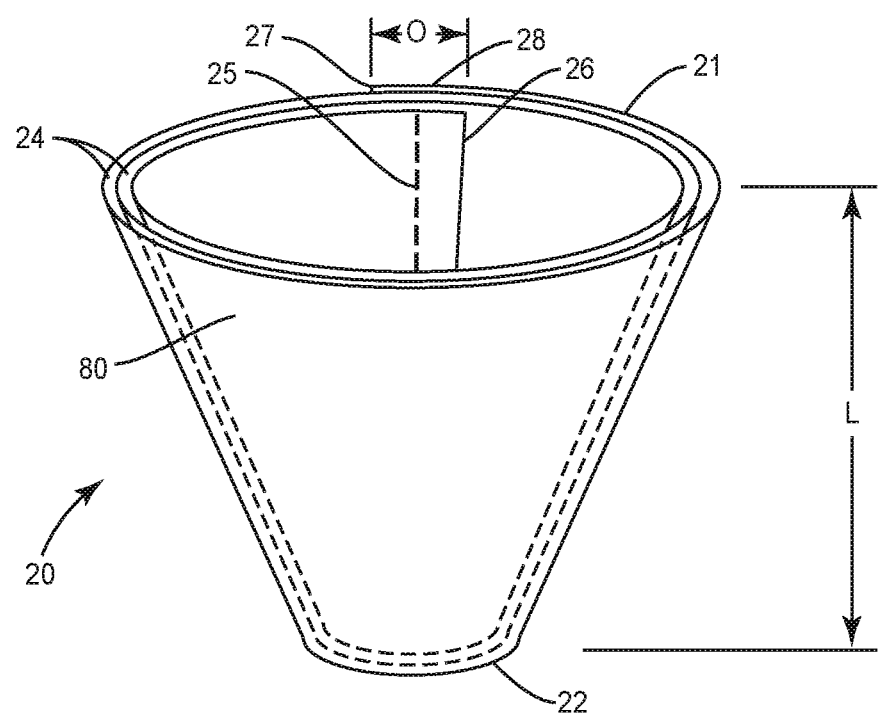
FIG. 5 is a perspective view of a first portion of a moisture diverting device.

One or both of the first and second portions 20, 30 can include a single-layer construction. FIG. 4 illustrates the first portion 20 with a single-layer. One or both of the portions 20, 30 can also include a multi-layer construction. FIG. 4 illustrates the single construction of the first portion 20. The second portion 30 can include a similar single-layer construction, or can include two or more layers. The layers can be constructed from a single piece of material that is formed into the multiple layers, or can be formed by different material pieces. FIG. 5 illustrates a first portion 20 with multiple layers 24. In the exemplary embodiment, the first portion 20 is formed by a single piece of moisture absorbent material 80 that is rolled into the multiple layers 24. The single piece of material 80 includes a leading edge 26 and a trailing edge 27. In the first portion 20 of FIG. 5, a majority of the first portion 20 includes a two-ply construction, with an overlap section 28 formed within the leading and trailing edges 26, 27 having a three-ply construction. The layers 24 are connected together at a connection seam 25 that extends along the length L within the overlap section 28. The connection seam 25 can be formed in a variety of manners, including adhesive, bonding, stitching, or mechanical fastener.

Figure 6:
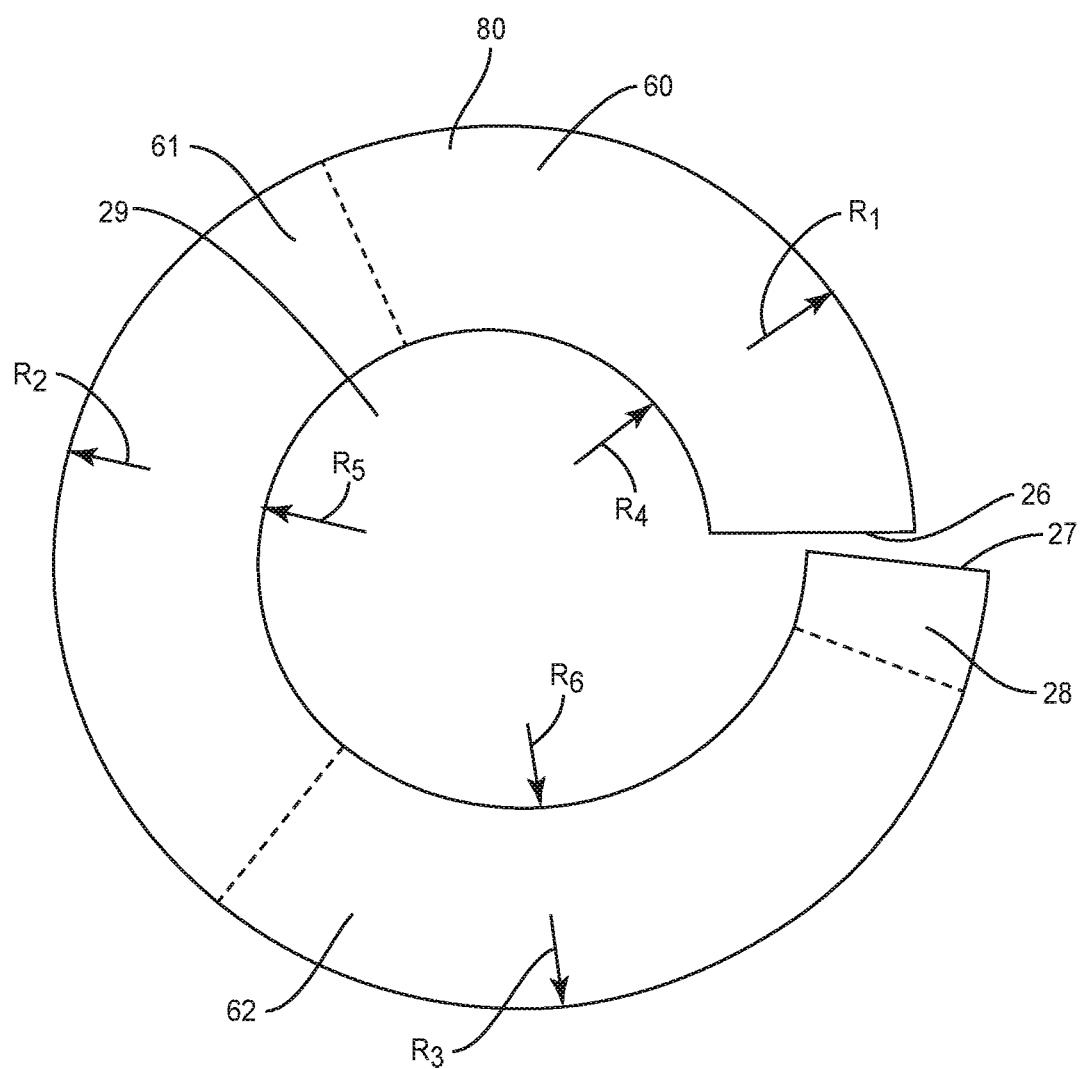
FIG. 6 is a plan view of a material piece in a flat configuration.

The first portion 20 as illustrated in FIG. 5 can be formed from a single flat piece of material 80. FIG. 6 illustrates the single piece of material 80 prior to being rolled into the frusto-conical first portion 20. The material 80 has a coiled shape that extends between the first and second edges 26, 27. An open interior 29 forms the central opening 23 when shaped. The piece of material 80 includes different sections 60, 61, 62, 28 that include different inner and outer radii. The radii of the different sections 60, 61, 62, 28 provide for the flat piece of material 80 to be rolled into a frusto-conical shape having multiple layers 24 that lie against each other.

One specific aspect provides for a first portion 20 with a frusto-conical shape having the following dimensions:

Height (measured between the first and second ends 21, 22): 3 inches
  Inside radius of first end 21: 1.6 inches
  Middle radius of first end 21: 1.7 inches
  Outside radius of first end 21: 1.8 inches
  Inside radius of second end 22: 0.6 inches
  Middle radius of second end 22: 0.7 inches
  Outside radius of second end 22: 0.8 inches To achieve the first portion 20 with this shape and size, the flat piece of material 80 includes the four sections 60, 61, 62, 28. The first section 60 extends 114° from the leading edge 26 and includes an outer radius R1 of 5.06 inches and an inner radius R4 of 1.90 inches. The second section 61 extends 114° from the first section 60 and includes an outer radius R2 of 5.38 inches and an inside radius R5 of 2.22 inches. A third section 62 extends 114° from the second section 61 and includes an outside radius R3 of 5.69 inches and an inside radius R6 of 2.53 inches. The overlap section 28 extends from the third section 62 and extends 14°. The overlap section 28 includes the same inside and outside radii as the third section 62.

The different layers 24 of the first portion 20 can also be fabricated from multiple pieces of material that are attached together in an overlapping arrangement. The different pieces of material can be constructed from the same or different materials.

The second portion 30 can be formed by one or more layers 34. With multiple layers 34, the layers 34 can be formed from a single piece of material 81 or multiple pieces of material 81. The different pieces of material 81 can be the same or different material.

Figure 7:
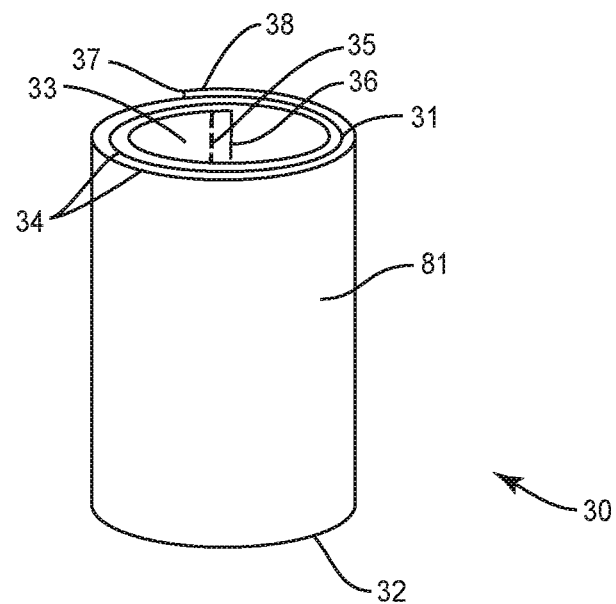
FIG. 7 is a perspective view of a second portion of a moisture diverting device.

FIG. 7 includes a second portion 30 with multiple layers 34 formed from a single piece of material 81. The piece of material 81 is rolled into the multiple layers 34 that extend around the central opening 33. FIG. 7 includes a second portion 30 with two layers for a majority of the portion 30, with an overlap section 38 formed between the leading edge 36 and the trailing edge 37 having three layers. Connection seam 35 extends the length of the overlap section 38 to secure the layers 34 together. Connection seam 35 can be formed by a variety of manners, including adhesive, bonding, stitching, or mechanical fastener.

Figure 8:
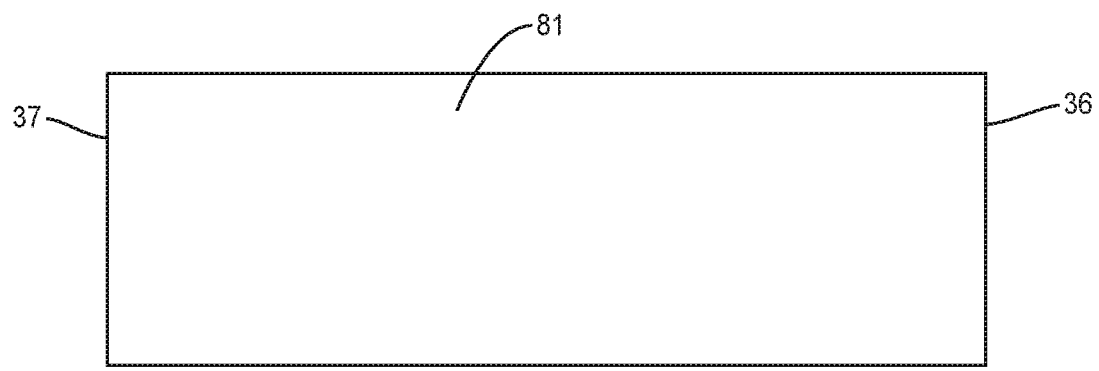
FIG. 8 is a plan view of a material piece in a flat configuration.

The second portion 30 of FIG. 7 is formed from a single piece of material 81. FIG. 8 illustrates the piece of material 81 in a flat orientation prior to being formed into the cylindrical shape. The piece of material 81 includes a constant height and length between the edges 36, 37.

Figure 9:
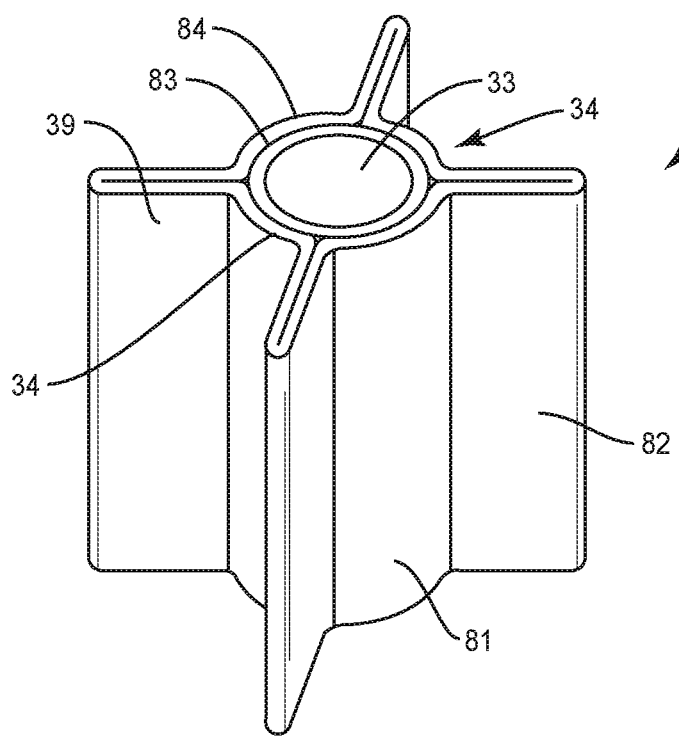
FIG. 9 is a perspective view of a second portion of a moisture diverting device.
Figure 10:
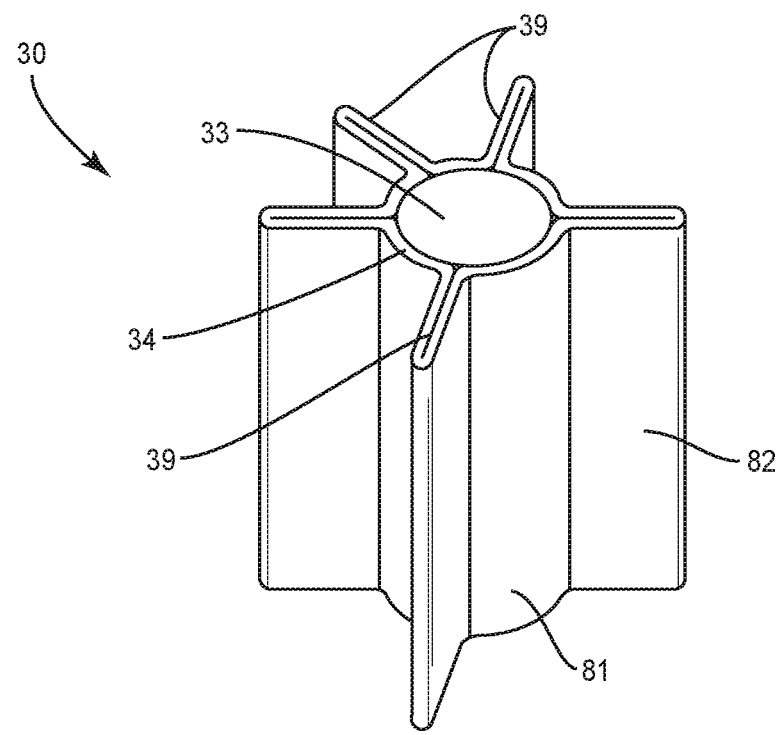
FIG. 10 is a perspective view of a second portion of a moisture diverting device.

The second portion 30 receives the liquid from the first portion 20 and provides for the liquid to evaporate. To facilitate the evaporation, the second portion 30 can include configurations that expand an area of the outer surface 82. To increase the area of the outer surface 82, the second portion 30 can include one or more fins 39 that extend outward from the opening 33. The number of fins 39 along the second portion 30 can vary. Further, the fins 39 can include different shapes and/or sizes. FIG. 9 includes the layers 34 including an inner layer 83 adjacent to the opening 33, and an outer layer 84 with fins 39. FIG. 10 includes a second portion 30 with fins 39 formed by pleats in the piece of material 81 of the second portion 30. The fins 39 can be symmetrically aligned around the opening 33, or can be randomly placed. The fins 39 can be a single layer of material, or two or more layers. FIGS. 9 and 10 include the fins 39 fabricated as folded pleats of material.

The dimensions and construction of the first and second portions 20, 30 can vary depending upon the specific contexts of use. This can include different shapes, dimensions, number of layers, and materials. One specific design the first and second portions 20, 30 constructed from a single layer 34. The overall height of the device 10 is about seven inches. A height of the first portion 20 is about 3 inches, and the height of the second portion 30 is about 4 inches. The first and second portions 20, 30 overlap about 0.375 inches.

The portions 20, 30 can be designed to accommodate the expected amount of moisture that will be encountered. By way of example, the device 10 can be expected to absorb ten ounces of water within a predetermined period of time, such as during a flight. The first portion 20 is constructed to absorb this expected amount of moisture within the predetermined time period.

Similarly, the second portion 30 functions to allow the moisture to evaporate within a predetermined period of time. This can include that the moisture be evaporated within a certain number of hours after a flight. The construction parameters provide for a surface area of the second portion 30 to allow for evaporation of the expected amount of moisture. This can include type of material, size, and shape of the second portion 30.

Figure 11:
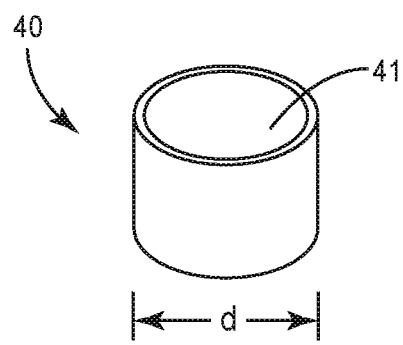
FIG. 11 is a perspective view of a band of a moisture diverting device.

The band 40 maintains the first and second portions 20, 30 positioned on the support member 161. As illustrated in FIG. 11, the band 40 includes a central opening 41 that receives the second portion 30. The band 40 is flexible and applies a compressive force to the second portion 30 to maintain the positioning on the support member 161. The band 40 can be attached to the second portion 30 such as by an adhesive, bonding, stitching, or mechanical fastener.

The band 40 applies the holding force to secure the position of the device 10 on the support member 161. The band 40 can include a smaller inner diameter than the outer diameter of the support member 161 such that the band 40 is stretched when the device 10 is assembled onto the support member 161. One aspect includes the inner diameter of the band 40 being 65% of the outer diameter of the support member 161. Thus, the band 40 is stretched and is able to apply a holding force.

Figure 12:
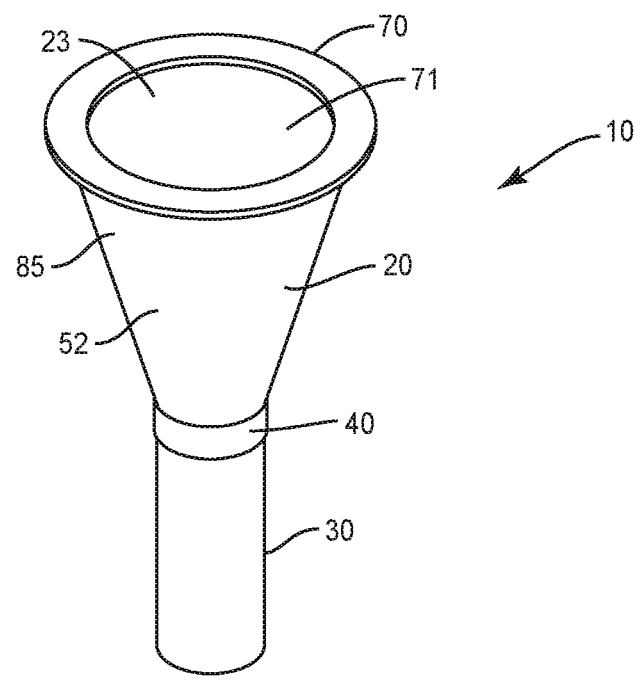
FIG. 12 is a perspective view of a moisture diverting device.

The device 10 can also include a flange 70 at the first end 21 of the first portion 20 to improve sealing against the insulation layer 162 and/or structural member 160. FIG. 12 illustrates a device 10 with a flange 70 that includes an annular shape with a central opening 71 that is aligned with the opening 23 in the first portion 20. The flange 70 includes an outer diameter that is larger than the first portion 20. The inner diameter of the flange 71 can be equal to or smaller than that of the first portion 20.

A moisture barrier 52 can also be attached to the outer surface 85 of the first portion 20 as illustrated in FIG. 12. The moisture barrier 52 substantially prevents the liquid from leaking from the first portion 20 prior to being moved to the second portion 30. The liquid barrier 52 assumes the tapered shape of the first portion 20. Liquid that escapes from the first portion 20 is captured by the liquid barrier 52 and funneled downward towards the second end 22 where it is transferred to the second portion 30. The moisture barrier 52 can be a film attached to the outer surface 85 of the first portion 20. The moisture barrier can also be a separate piece of material that is positioned on the exterior.

In use, the device 10 is prefabricated and then preassembled onto the support member 161. This reduces the time required by the worker installing the moisture treatment for the support member 161. The worker is merely required to position the device 10 along the support member 161 after installation, and is not required to also assemble the device 10 and attach the device 10 to the support member 161 prior to installation.

Figure 13:
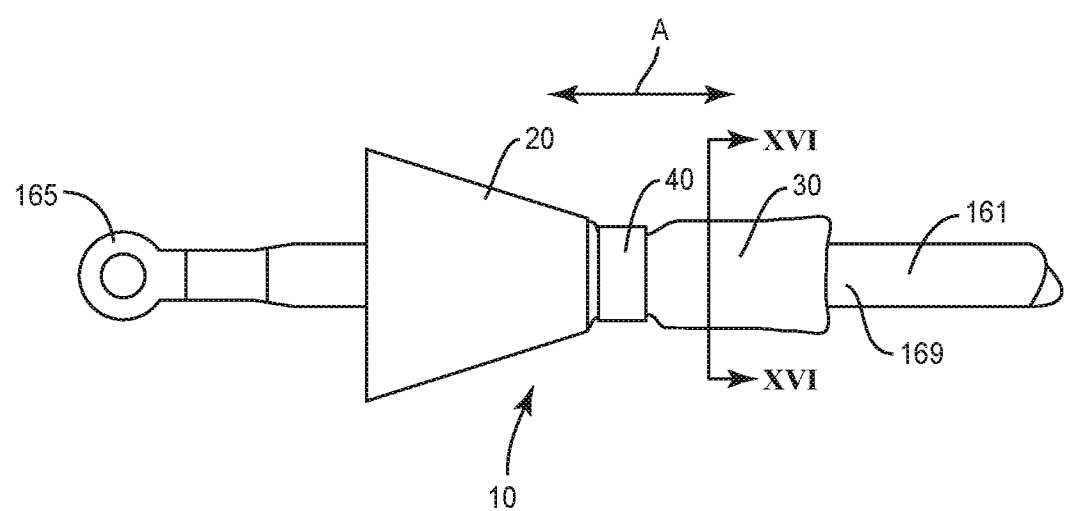
FIG. 13 is a side view of a moisture diverting device attached to a support member.

FIG. 13 illustrates a device 10 preassembled onto a support member 161. This preassembled support member 161 is provided to the worker who is tasked with the installation. As illustrated in FIG. 13, the device 10 is spaced away from an end 165 of the of the support member 161 and over an inner section 169 of the support member 161 that is spaced away from the end 165. The band 40 secures the device 10 to the support member 161, yet allows the worker to move the device 10 along the support member 161 as necessary as illustrated by arrows A.

As illustrated in FIG. 13, the device 10 is initially positioned along the support member 161 away from an end 165 that is to be attached to the vehicle. Once the end 165 is attached, the device 10 is moved along the support member 161 to extend over the end 165 to capture the moisture.

Figure 14A:
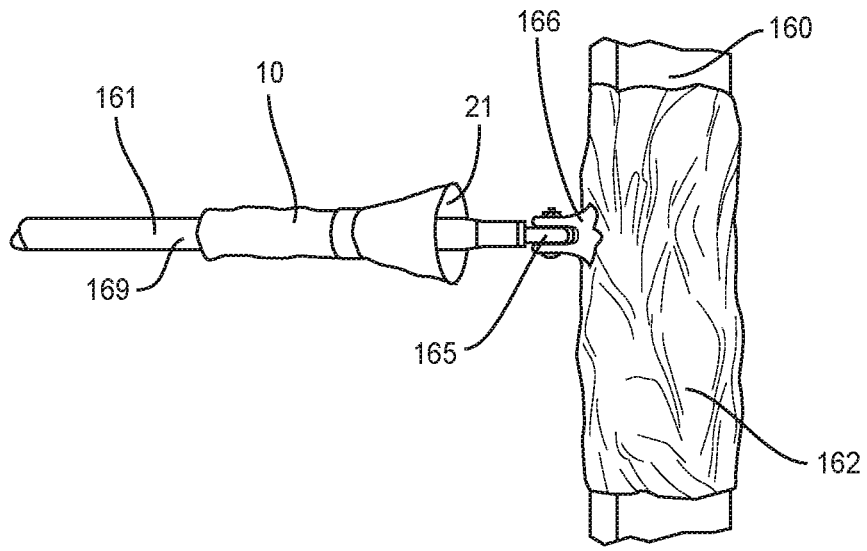
FIG. 14A is a side view of a moisture diverting device attached to a first section of a support member.
Figure 14B:
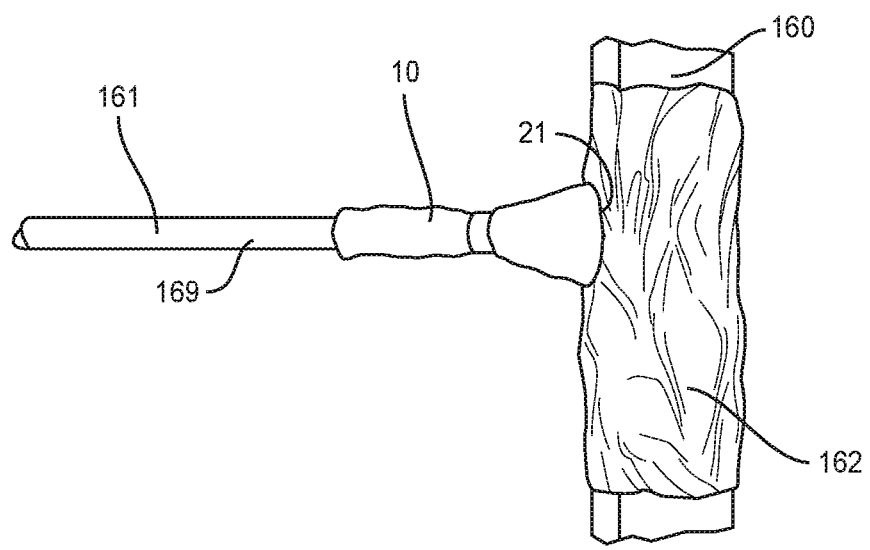
FIG. 14B is a side view of a moisture diverting device attached to a second section of a support member.

FIGS. 14A and 14B illustrate use of the device 10. As illustrated in FIG. 14A, the support member 161 has been attached to the structural member 160. Specifically, the end 165 of the support member 161 includes a receptacle that aligns with a connector 166 on the structural member 160. The connector 166 can include a clevis that is connected to the end 165 with a pin. During the attachment, the device 10 is positioned over an inner section 169 of the support member 161 away from the first end 165 such that it is out of the way of the worker. After the support member 161 is connected to the structural member 160, the device 10 is moved from the inner section 169 along the support member 161 and over the connection. The first end 21 of the first portion 20 is abutted against the structural member 160 and/or the insulation layer 162. The device 10 is thus positioned to capture the moisture with the first portion 20. The moisture is then transferred to the second portion 30 where it is evaporated from the device 10.

The band 40 is positioned over the second portion 30 and secures the device 10 in position along the support member 161. The band 40 also provides for the device 10 to be moved along the support member 161 as needed. As illustrated in FIGS. 14A and 14B, the device 10 can be moved in a first direction towards the structural member 160 to be positioned over the end 165. The device 10 can also be moved along the support member 161 in the opposing direction away from the structural member 160. This provides for accessing the end 165, connector 166, structural member 160, insulation layer 162, or other component in this area, such as during maintenance. Once the task is completed, the device 10 can be moved back over the first end 165. The band 40 allows for the movement while the device 10 remains positioned around the support member 161.

Figure 15:
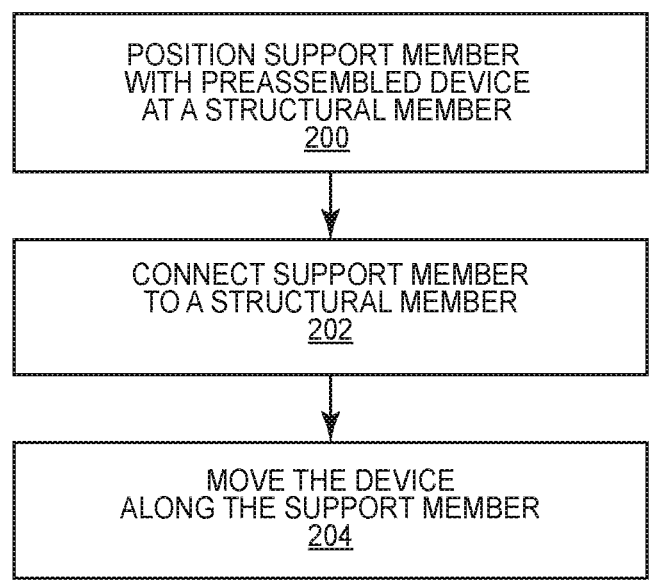
FIG. 15 is a flowchart of a method of diverting moisture from a support member.

FIG. 15 illustrates the steps of a method of using the device 10 to divert moisture from the support member 161. The method includes positioning a first end 165 of the support member 161 at a structural member 160 (box 200). The device 10 is preassembled onto the member 161 and extends around the support member 161. The device 10 is also positioned along the support member 161 away from the first end 165. The first end 165 of the support member 161 is then connected to the structural member while the device 10 is attached and positioned away from the first end 165 (box 202). Once the support member 161 is connected, the device 10 is moved along the support member 161 while the device 10 remains around the support member 161 (box 204). The device 10 is positioned with a first portion 20 that is fabricated from a moisture absorbent material over the first end 165 that is attached to the structural member, and a second portion 30 of the device 10 that is coupled to the first portion 20 is positioned away from the first end 165. The second portion 30 is fabricated from an evaporative material.

The device 10 can be prefabricated and preassembled onto the support member 161 prior to being given to the worker that installs the support member 161. These processes can occur earlier in a separate assembly operation or can occur at the vendor who supplies the support member 161.

The first portion 20 can include a frusto-conical shape prior to positioning over the end of the support member 161. During the positioning, the first portion 20 can be deformed and manipulated into different shapes to conform to the specific structural components in the vehicle. This can include deforming the first portion 20 to fit around the insulation layer 162.

Figure 17:
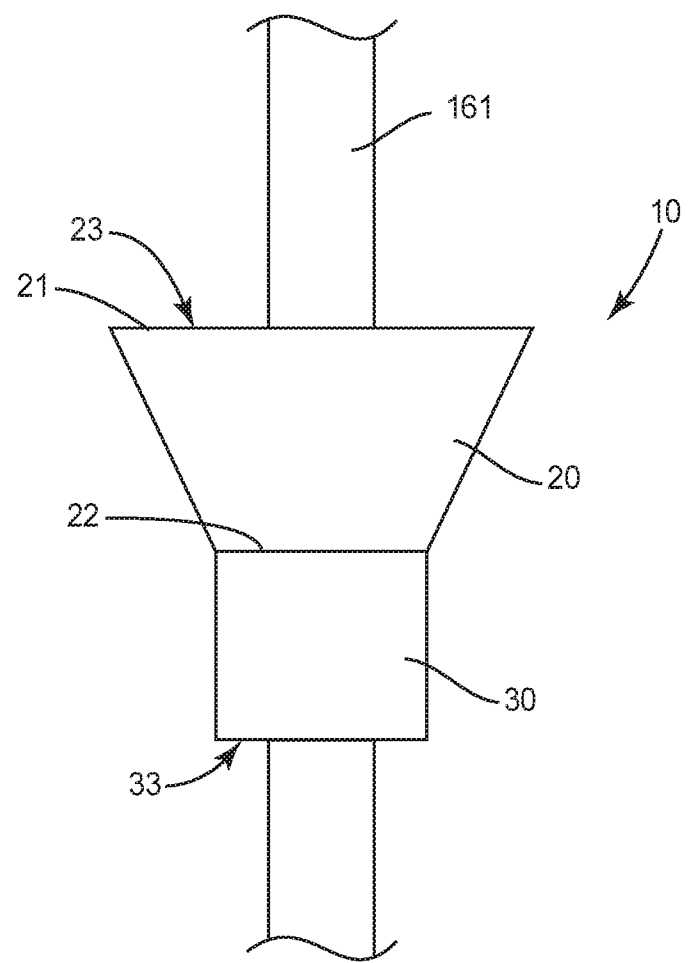
FIG. 17 is a schematic side view of a moisture diverting device with a first portion and a second portion attached to a support member.

FIG. 17 illustrates a device 10 to divert moisture from a support member 161. The device 10 includes a first portion 20 with a leading end 21, a trailing end 22, and a first opening 23 that extends between the ends 21, 22 and that is sized to receive the support member 161. The first portion 20 is fabricated from a moisture absorbent material. A second portion 30 is positioned at the trailing end 22 of the first portion 20. The second portion 30 has a second opening 33 that is aligned with the first opening 23 to receive the support member 161. The second portion 30 is fabricated from an evaporative material. The second portion 30 is coupled to the first portion 20 such that the moisture absorbed by the first portion 20 is transmitted to and evaporated by the second portion 30.

FIG. 2 includes the device 10 being used along the support members 161 between the first wall 155 and the second wall 162 which in FIG. 2 includes the insulation layer 162. The device 10 can also be used at other locations in the aircraft, including but not limited to on the opposing side of the insulation layer 162 and on the opposing end of the support members 161 such as where it connects with a fascia wall 152 or a luggage compartment 157. The devices 10 can be used in a wide variety of locations and on a wide variety of vehicles.

The device 10 can be used on a variety of vehicles 100. Vehicles 100 include but are not limited to manned aircraft, unmanned aircraft, manned spacecraft, unmanned spacecraft, manned rotorcraft, unmanned rotorcraft, satellites, rockets, missiles, manned terrestrial vehicles, unmanned terrestrial vehicles, manned surface water borne vehicles, unmanned surface water borne vehicles, manned sub-surface water borne vehicles, unmanned sub-surface water borne vehicles, and combinations thereof.

The present disclosure can be carried out in other ways than those specifically set forth herein without departing from essential characteristics of the disclosure. The present aspects are to be considered in all respects as illustrative and not restrictive, and all changes coming within the meaning and equivalency range of the appended claims are intended to be embraced therein.

What is claimed is:

1. A device to divert moisture from a support member, the device comprising:
    a first portion with a first end, a second end, and a first opening that extends between the ends and that is sized to receive the support member, the first portion fabricated from a moisture absorbent material that is rolled into multiple layers that overlap and are connected together at a seam; and
    a second portion positioned at the second end of the first portion, the second portion having a second opening that is aligned with the first opening to receive the support member, the second portion fabricated from an evaporative material,
    the second portion coupled to the first portion such that the moisture absorbed by the first portion is transmitted to and evaporated by the second portion;
    the first portion comprising a conical shape with the first end having a larger diameter than the second end.

2. The device of claim 1, wherein the second portion has a cylindrical shape.

3. The device of claim 2, wherein an outer layer of the second portion comprises one or more fins that extend radially outward away from the second opening.

4. The device of claim 1, further comprising a moisture barrier positioned on an outer surface of the first portion.

5. The device of claim 1, further comprising a flexible band that extends around an outer surface of the second portion and is configured to secure the device to the support member.

6. The device of claim 1, wherein the first and second openings are co-axially aligned.

7. A method of diverting moisture from a support member, the method comprising:
    positioning a first end of a support member at a structural member, the support member comprising a moisture diverting device that extends around the support member and is attached to the support member away from the first end with the moisture diverting device having a tapered first portion with a larger outer end and a smaller inner end and formed from a material that is rolled into multiple layers that overlap and are connected together at a seam and with the smaller inner end connected to a second portion;
    connecting the first end of the support member to the structural member while the moisture diverting device is attached to the support member and positioned away from the first end;
    moving the moisture diverting device along the support member while the moisture diverting device remains around the support member and positioning the tapered first portion of the moisture diverting device that is fabricated from a moisture absorbent material over the first end of the support member that is attached to the structural member while positioning the second portion of the device that is coupled to the first portion away from the first end of the support member with the second portion fabricated from an evaporative material.

8. The method of claim 7, further comprising:
    absorbing the moisture with the first portion of the moisture diverting device;
    transmitting the moisture from the first portion to the second portion of the moisture diverting device; and
    evaporating the moisture from the second portion of the moisture diverting device.

9. The method of claim 7, further comprising abutting the first portion of the moisture diverting device against an insulation layer that is positioned at the structural member such that the first portion is spaced away from the structural member.

10. The method of claim 7, further comprising securing the moisture diverting device over the first end of the support member with an elastic band that is on the second portion of the moisture diverting device.

11. The method of claim 8, further comprising after evaporating the moisture from the second portion, moving the moisture diverting device along the support member and away from the first end of the support member and exposing the first end of the support member.

12. The method of claim 11, wherein moving the moisture diverting device along the support member and away from the first end of the support member comprises sliding the moisture diverting device along the support member while the moisture diverting device extends around the moisture diverting device.

13. The method of claim 7, further comprising coupling the first portion and the second portion of the moisture diverting device together prior to attaching the moisture diverting device to the structural member.

14. The method of claim 7, further comprising connecting the first end of the support member to a connector on the structural member.

15. The method of claim 7, further comprising positioning the first portion of the moisture diverting device that has a conical shape over the first end of the support member and positioning the second portion of the moisture diverting device that has a cylindrical shape over an inner section of the support member away from the first end of the support member.

16. The method of claim 7, further comprising positioning an inner layer of the second portion of the moisture diverting device against the support member and facing an outer layer outward away from the support member with each of the inner and outer layers formed from a common piece.

17. A vehicle comprising:
 a first wall;
 a second wall positioned within and spaced away from the first wall;
 a structural member positioned between the first and second walls;
 a support member at the second wall and that includes an end connected to the structural member; and
 a moisture diverting device attached to the support member and extending over the end of the support member to divert moisture away from the support member, the moisture diverting device comprising:
  a first portion with a first end, a second end, and a first opening that extends between the ends and that is sized to receive the support member, the first portion fabricated from a moisture absorbent material; and
  a second portion positioned at the second end of the first portion, the second portion having a second opening that is aligned with the first opening to receive the support member, the second portion fabricated from an evaporative material;
  the second portion coupled to the first portion such that the moisture absorbed by the first portion is transmitted to and evaporated by the second portion.

18. The vehicle of claim 17, wherein the vehicle is selected from the group consisting essentially of an aircraft, a spacecraft, a rotorcraft, a satellite, a rocket, a missile, a terrestrial vehicle, a surface water borne vehicle, and a sub-surface water borne vehicle.

19. The vehicle of claim 17, wherein the first portion comprises a rolled construction with multiple overlapping layers.

20. The device of claim 1, wherein a majority of the first portion comprises a two-ply construction and with an overlap section having a three-ply construction.

* * * * *